(No Model.)

A. J. McGEHEE.
COTTON BALE COVER.

No. 390,499. Patented Oct. 2, 1888.

Witnesses
Geo. J. Loefer
C. E. Doyle

Inventor
A. J. McGehee
By his Attorneys

UNITED STATES PATENT OFFICE.

ABNER JUDSON McGEHEE, OF JACKSON, TENNESSEE.

COTTON-BALE COVER.

SPECIFICATION forming part of Letters Patent No. 390,499, dated October 2, 1888.

Application filed June 26, 1888. Serial No. 278,248. (No model.)

*To all whom it may concern:*

Be it known that I, ABNER JUDSON MC-GEHEE, a citizen of the United States, residing at Jackson, in the county of Madison and State of Tennessee, have invented a new and useful Improvement in Cotton-Bale Covers, of which the following is a specification.

My invention relates to an improvement in cotton-bale covers; and it consists in the peculiar arrangement and construction of devices that will be more fully set forth hereinafter, and particularly pointed out in the claims.

Figure 1:
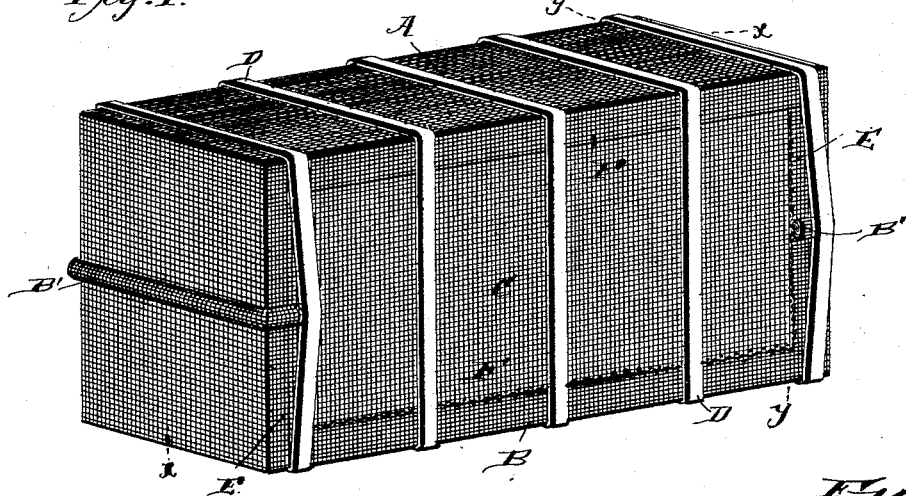
Figure 2:
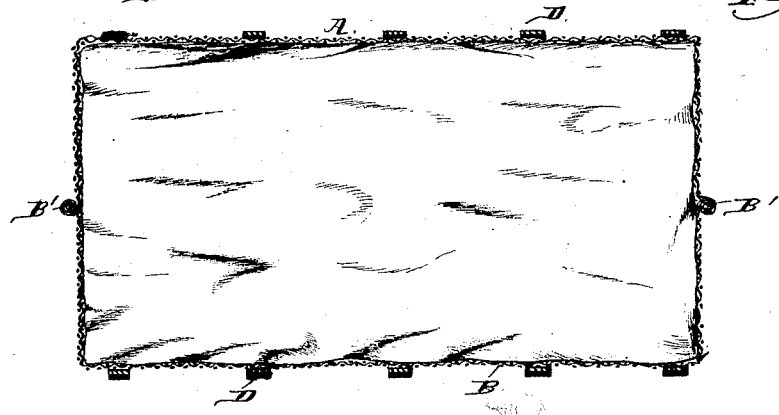
Figure 3:
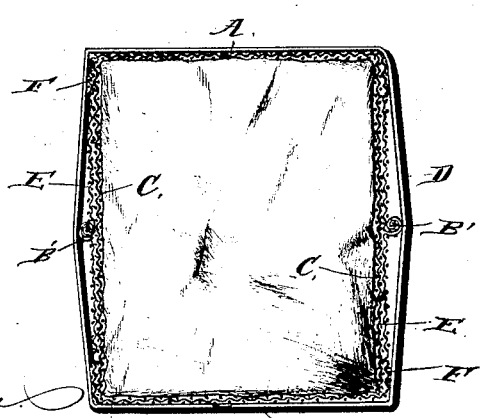
Figure 4:

In the accompanying drawings, Figure 1 is a perspective view of a bale of cotton inclosed in a bag or envelope embodying my improvements. Fig. 2 is a sectional view on the line $x\,x$ of Fig. 1. Fig. 3 is a similar view on the line $y\,y$ of Fig. 1. Fig. 4 is a detail enlarged view representing the rolled connection between the sections.

Referring by letter to the drawings, A designates a wire cloth or sheet of netting of sufficient length to extend the entire length of the upper side of the bale and extend downward at its ends slightly below the centers of the ends of the bale, and B designates a similar wire cloth or sheet of netting which extends under the lower side of the bale and extends upward at its ends slightly beyond the centers of the ends of the bale, the said wire cloth or netting being of a width somewhat in excess of the width of the bale, so that its edges overhang the sides of the bale. The adjacent ends of the wire cloths or sheets of netting are rolled together, as at B' B', to hold them firmly in place in contact with the bale.

C C represent rectangular pieces of wire cloth or netting, which are placed on the sides of the bale that are left uncovered by the wire-cloths A B, and the projecting or overhanging edges of the latter are folded inward over the edges of the pieces C, as shown in Figs. 1 and 3, and the usual ties or bands, D, are then secured around the bale in such positions as to clasp the end flaps, E, of the cloths A and B, formed by the turned-over edges thereof, and also to clasp the side flaps, F, of the said cloths. The said ties or bands secure the bagging or envelope so firmly on the bale that no necessity exists for sewing or otherwise fastening the bagging.

It will be understood that the wire-cloths A B may be made in a single piece extending around four sides of the bale; but it is preferable to form the same as herein described, in that the bagging or envelope is more easily applied, the overhanging edges are more easily folded into position, and the parts are adapted to be applied as the bale is compressed.

The wire-cloth has meshes of sufficient fineness to prevent sparks or flames from passing through them, and hence the bale of cotton which is covered by the said cloth is rendered fire-proof and cannot be ignited from the outside.

Having thus described the invention, I claim—

1. A bagging or envelope for cotton-bales, comprising the pieces C on opposite sides of the bale and the pieces A B, covering the remaining intermediate sides and the ends of the bale, the side edges of the pieces A B being turned over the edges of the pieces C, and the meeting ends of said pieces A B being rolled together to form the securing-rolls B', substantially as described.

2. A bagging or envelope for cotton-bales, comprising the pieces C on opposite sides of the bale, the pieces A B, covering the remaining intermediate sides and the ends of the bale, the side edges of the pieces A B being turned over the edges of the pieces C, and the meeting ends of said pieces A B being rolled together to form the securing-rolls B', and the ties or bands encompassing the bale and bearing on the rolls B', substantially as described.

In testimony that I claim the foregoing as my own I have hereto affixed my signature in presence of two witnesses.

ABNER JUDSON McGEHEE.

Witnesses:
W. A. CALDWELL,
J. W. VANDEN.